(12) United States Patent
Creamer et al.

(10) Patent No.: US 6,879,673 B2
(45) Date of Patent: Apr. 12, 2005

(54) REMOTE SETUP OF THIRD PARTY TELEPHONE CALLS

(75) Inventors: Thomas E. Creamer, Boca Raton, FL (US); Victor S. Moore, Boynton Beach, FL (US); Linda A. Steinmuller, Boca Raton, FL (US); Glen R. Walters, Hollywood, FL (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 10/078,623

(22) Filed: Feb. 19, 2002

(65) Prior Publication Data

US 2003/0156698 A1 Aug. 21, 2003

(51) Int. Cl.[7] .............................................. H04M 3/42
(52) U.S. Cl. .............................. 379/207.01; 379/202.01
(58) Field of Search ....................... 379/207.01, 208.01, 379/212.01, 202.01

(56) References Cited

U.S. PATENT DOCUMENTS

| | | | |
|---|---|---|---|
| 5,724,411 A | 3/1998 | Eisdorfer et al. | 379/93.23 |
| 5,894,504 A | 4/1999 | Alfred et al. | 379/88.13 |
| 5,930,338 A | 7/1999 | McKendry et al. | 379/88.25 |
| 6,026,156 A | 2/2000 | Epler et al. | 379/215 |
| 6,067,443 A | 5/2000 | Fuller et al. | 455/31.2 |
| 6,185,283 B1 | 2/2001 | Fuller et al. | 379/88.21 |
| 6,269,159 B1 * | 7/2001 | Cannon et al. | 379/202 |
| 6,330,320 B1 * | 12/2001 | Cornell et al. | 379/202.01 |
| 6,339,639 B1 * | 1/2002 | Henderson | 379/142.08 |
| 6,418,216 B1 * | 7/2002 | Harrison et al. | 379/208.01 |
| 6,438,216 B1 * | 8/2002 | Aktas | 379/88.01 |
| 6,633,985 B2 * | 10/2003 | Drell | 713/201 |
| 6,671,262 B1 * | 12/2003 | Kung et al. | 370/260 |
| 2002/0118810 A1 * | 8/2002 | Akhteruzzaman et al. | 379/212.01 |
| 2002/0181694 A1 * | 12/2002 | Mani | 379/373.02 |
| 2003/0152207 A1 * | 8/2003 | Ryan | 379/201.4 |
| 2003/0156697 A1 * | 8/2003 | Svercek | 379/202.01 |
| 2003/0190028 A1 * | 10/2003 | Maciejewski et al. | 379/215.01 |

OTHER PUBLICATIONS

U.S. Appl. No. 09/093,686, filed Jun. 9, 1998, Dunn et al.

* cited by examiner

*Primary Examiner*—William J. Deane, Jr.
(74) *Attorney, Agent, or Firm*—Akerman Senterfitt

(57) ABSTRACT

A method of establishing a third party call can include, responsive to a call initiated by a third party to a directory number of a called party, determining that the called party is engaged in an existing telephone call with one or more parties. The telephone call can be processed in a telephony application, wherein the telephony application can determine whether the third party has authority to join the existing call with the called party. If so, the third party can be connected with the existing call.

22 Claims, 3 Drawing Sheets

REMOTE SETUP OF THIRD PARTY TELEPHONE CALLS

BACKGROUND OF THE INVENTION

1. Technical Field

The invention relates to the field of telephony, and more particularly, to the field of enhanced calling services.

2. Description of the Related Art

Conventional telephony services provide several different features for including a third party within an existing telephone call. For example, telephony services commonly referred to as "three-way calling" and "call waiting" are two features which can include a third party within an existing telephone call in one form or another. Despite the convenience afforded by such telephony services, the features presently available can be somewhat limited in nature. In particular, conventional telephony services do not provide a feature which allows a third party to interrupt an existing telephone call without operator assistance should the need arise.

For example, "three-way calling" enables one of two parties engaged in an existing telephone call to initiate a second outbound telephone call to a third party. When the third party answers the outbound telephone call, the third party can be included or teleconferenced into the original or existing telephone call. Three-way calling, however, is restrictive in that only a party engaged in the original call can add a third party to a call by initiating an outbound call to the third party. The third party is not provided with any independent means for initiating a teleconference with either of the two parties already engaged in the original, ongoing telephone call.

"Call waiting" enables a third party to attempt to interrupt an ongoing telephone call between two callers. As is well known in the art, the called party already involved in an existing telephone call typically hears an audible signal indicating that a third party is attempting to call or interrupt. The called party, however, can choose whether to answer the third party call or to ignore the third party call and continue with the original call. Thus, the third party cannot force the called party to answer the incoming call. Additionally, if the called party does choose to answer the incoming call from the third party, the other caller involved in the original call is placed on hold. Thus, the third party is not conferenced into the existing telephone call.

SUMMARY OF THE INVENTION

The invention disclosed herein provides a method and apparatus for including a third party within an existing telephone call. In particular, the present invention allows a third party to call one of several other parties already engaged in an existing and ongoing telephone call and to join or intercept that existing call. Accordingly, the present invention can be used in cases wherein a parent calls home but the child fails to answer call waiting requests or in a business context to enable third parties to join an existing conference call. Accordingly, when a third party calls another party whose telephone is in an "off-hook" state, the third party, whether the option is presented to the third party or the third party engages the service, can choose to be conferenced into the existing telephone call. Notably, the invention can include security features to prevent unauthorized persons from conferencing into existing telephone calls.

One aspect of the present invention can include a method of establishing a third party call. Responsive to a telephone call initiated by a third party to the directory number of a called party, a determination can be made as to whether the called party is engaged in an existing telephone call with one or more other parties. The telephone call can be processed in a telephony application. The telephony application can determine whether the third party has authority to join the existing telephone call with the called party. If so, the third party can be connected with the existing telephone call.

A password can be received from the third party so that a determination can be made as to whether the third party is an authorized party. Still, additional information such as caller identification information can be used apart from the password or in combination with the password to determine whether the third party is an authorized party. For example, the method can include identifying caller identification information associated with the third party, comparing the caller identification information with a list of authorized callers, and determining whether the third party is an authorized party.

The connecting step can include connecting the call only if the directory number of the called party has been registered to receive calls initiated from authorized remote third party callers when engaged in an existing telephone call. Notably, the method can include establishing a communications link between the third party and the called party, wherein the other parties involved in the existing telephone call can be either included or excluded from the resulting conference call.

Another aspect of the present invention can include a method of establishing a third party call including receiving a telephone call from the third party to an access directory number. A directory number from the third party can be received, wherein the directory number is associated with a called party. The telephone call can be processed in a telephony application. The telephony application can determine that the called party is engaged in an existing telephone call with one or more other parties, and further determine whether the third party has authority to join the existing telephone call with the called party. If so, the third party can be connected with the existing telephone call.

The processing step further can include prompting the third party for a password, receiving the password from the third party, and determining whether the third party is an authorized party using at least the password. As mentioned, caller identification information can be used to further verify whether the third party is an authorized party. For instance, the method can include identifying caller identification information associated with the third party, comparing the caller identification information with a list of authorized callers, and determining whether the third party is an authorized party.

The connecting step can include connecting the call only if the directory number of the called party has been registered to receive calls initiated from authorized remote third party callers when engaged in an existing telephone call. A communications link between the third party and the called party can be established exclusive of the other parties involved in the existing telephone call. The other parties, however, may be included in the resulting teleconference.

Another aspect of the present invention can include an IP node having a telephony application configured to first determine that a called party is engaged in an existing telephone call with one or more other parties responsive to a telephone call initiated by a third party to a directory number of the called party. The telephony application can process the telephone call and determine whether the third party has authority to join the existing telephone call with the called party. If so, the telephony application can connect the third party with the existing telephone call.

Yet another aspect of the present invention can include an IP node having a telephony application configured to receive a telephone call from a third party to an access directory number. The telephony application can receive a directory number from the third party, wherein the directory number is associated with a called party. The telephony application can process the telephone call and determine that the called party is engaged in an existing telephone call with one or more other parties. The telephony application further can determine whether the third party has authority to join the existing telephone call with the called party. If so, the telephony application can connect the third party with the existing telephone call.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides for the remote setup of third party telephone calls. Specifically, a method and apparatus is disclosed for including a third party within an existing telephone call. In accordance with the present invention, a third party can call one of several other parties already engaged in an existing telephone call, and can join that existing call. Thus, when the third party calls another party whose telephone is in an "off-hook" state, the third party can be conferenced into the existing telephone call without requiring the assistance of an operator. Notably, security features such as passwords can be further provided to prevent unauthorized persons from conferencing into existing telephone calls.

Figure 1:
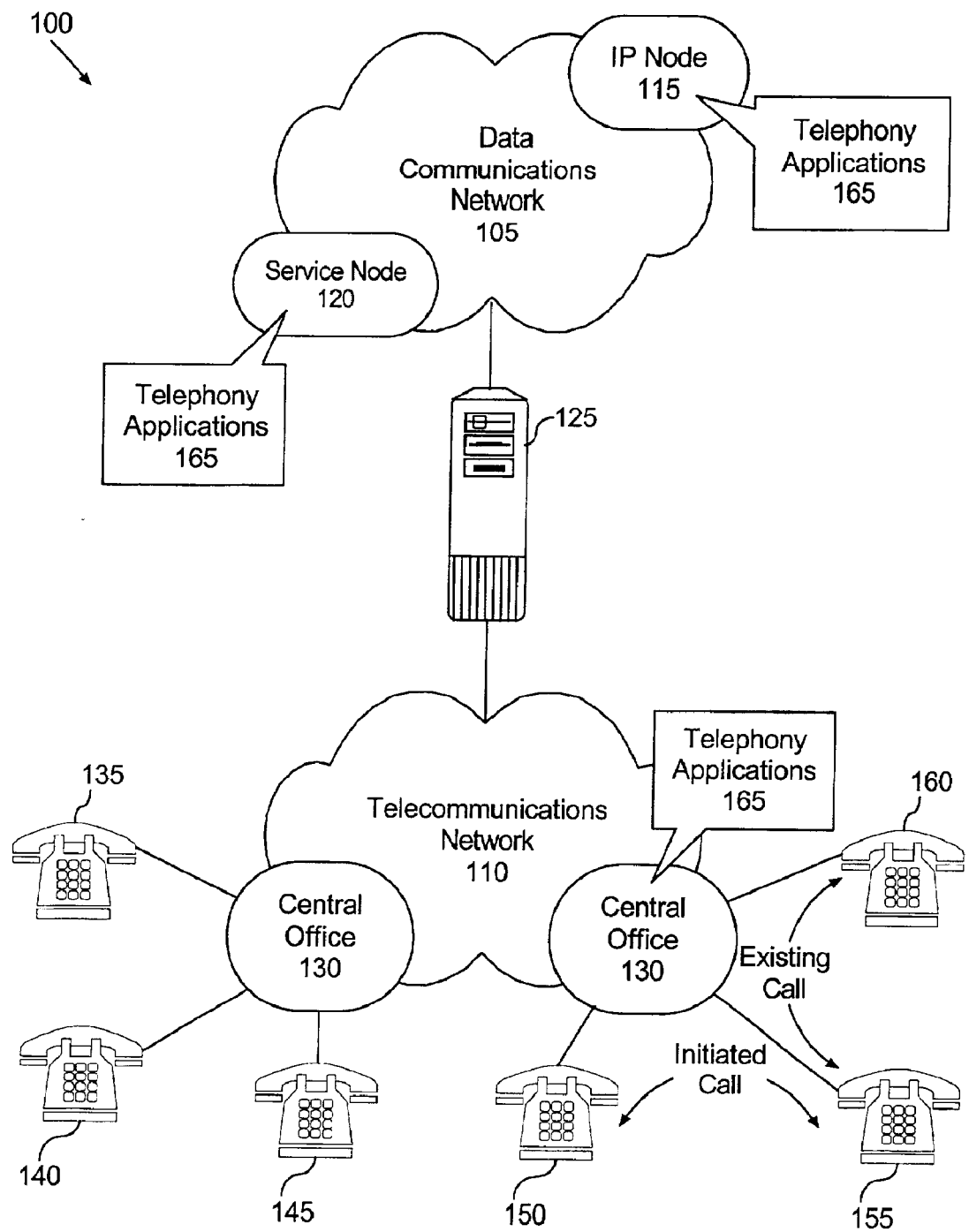
FIG. 1 is a schematic diagram illustrating an exemplary system for remote setup of third party calls in accordance with the inventive arrangements disclosed herein.

FIG. 1 is a schematic diagram illustrating an exemplary system for the remote setup of third party calls in accordance with the inventive arrangements disclosed herein. As shown in FIG. 1, system 100 can include a data communications network 105 and a telecommunications network 110 communicatively linked to one another through a gateway 125 such as a Voice-over-IP (VoIP) gateway. The telecommunications network 110 can include, for example, the public switched telephone network (PSTN).

Local access to subscriber terminals 135–160 can be provided via the central offices 130. The term subscriber terminals, as used herein, is not limited to land line telephones. Rather, as used herein, subscriber terminals also can include other voice communications devices. In particular, subscriber terminals can include wireless voice communications devices including wireless telephones. As such the term telephone call or call can include, but is not limited to, voice communications between land line and/or wireless devices which are routed through the telecommunications network 110.

The central offices 130 can include one or more telephone switching systems having telephony applications 165 stored therein. Telephony applications 165 can include telephony resources such as application programs and data stores which provide enhanced telephony service features to subscribers. For example, telephony applications 165 can provide subscribers with telephony service features such as caller identification (ID), three-way calling, call forwarding, call transfer, call screening, and call rejection. Additionally, telephony applications 165 can provide enhanced routing functions relating to the setup, maintenance, and termination of the calls initiated by calling parties using the subscriber terminals 135–160. Telephony applications 165 further can be included within a service control point which can be linked to databases within the telephony network. Through the service control point, telephony applications 165 can process control service inquiries and provide services such as 800, and 900 numbers, virtual private networking, three-way calling, and the like.

The data communications network 105, for example the Internet, can include one or more IP nodes 115 and one or more service nodes 120. The IP nodes 115 and the service nodes 120 can provide Web-based IP switching for both IP and traditional telephony networks. As shown, telephony applications 165 also can be included within the IP node 115 and the service node 120.

In operation, subscriber 155 can be involved in an existing telephone call with subscriber 160. As shown in FIG. 1, the existing telephone call can be processed using the telephone switching system located in the central office 130. Subsequently, subscriber 150 can initiate a telephone call to subscriber 155 also through the telephone switching system 130. Notably, subscriber 155 can be registered with a service which allows the third party to conference into an existing telephone call. More specifically, subscriber 155 can be enrolled in a service associated with a particular directory number such that when the subscriber 150 calls the directory number, the subscriber 150 can be allowed to join the existing telephone call between subscriber 155 and 160.

The service, which can be implemented as one of the telephony applications 165, can be implemented within the telephone switching system within the central office 130. For example, the service can be implemented as an extension to third party calling. Alternatively, the service can be implemented within a service control point within the telecommunications network. The service also can be implemented within the IP node 115 or the service node 120 of the data communications network 105.

In any case, having registered for the service and specifying one or more numbers for which the service can be active, the subscriber can initiate a telephone call to one of the directory numbers associated with the telephony service. If the called directory number, in this case the directory number for subscriber 155, is in an off-hook state, and subscriber 155 does not have call waiting or chooses not to answer the call waiting requests, the subscriber 150 can choose to be joined to the existing telephone call between subscriber 155 and subscriber 160. Subscriber 150, however, may be required to provide a password for added security.

Figure 2:
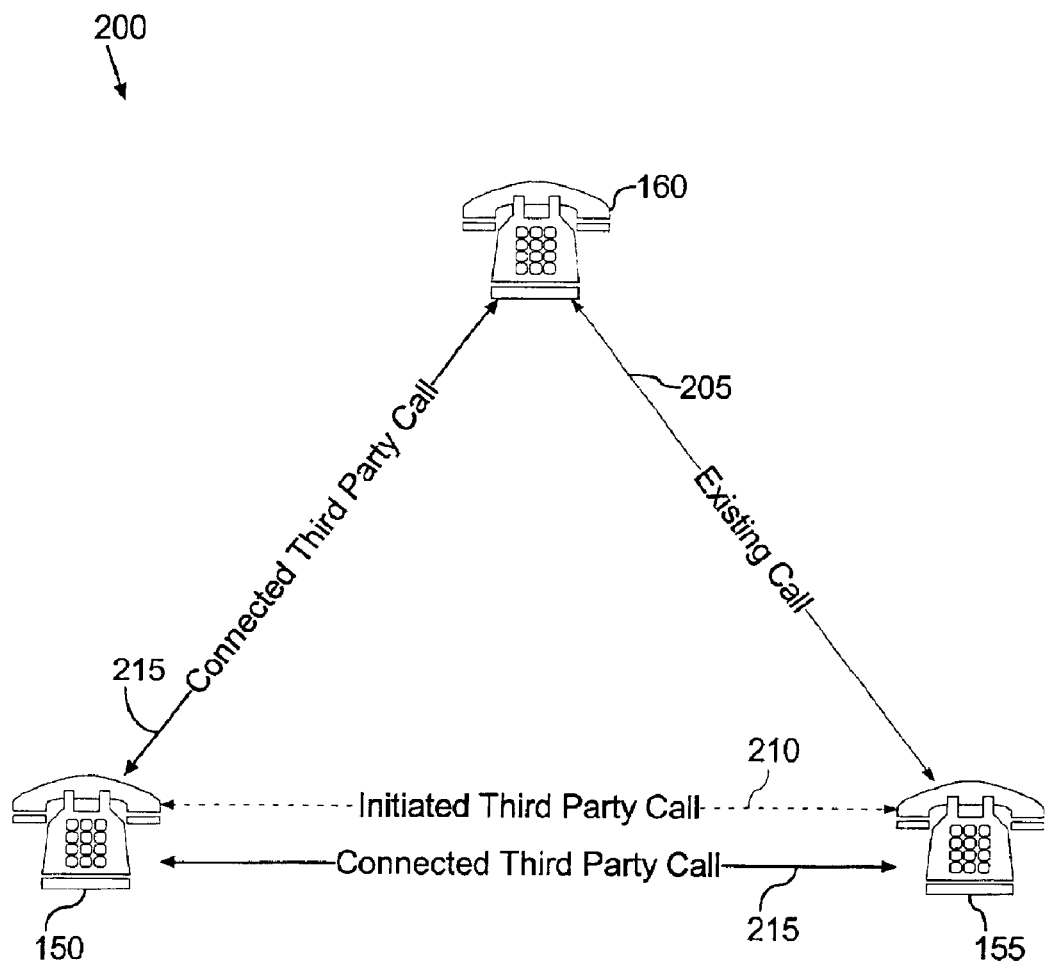
FIG. 2 is a call diagram illustrating the remote setup of a third party call.

FIG. 2 is a call diagram illustrating remote setup of third party calls in accordance with the inventive arrangements disclosed herein. As shown in FIG. 2, subscriber 155 and subscriber 160 can be engaged in an existing telephone call 205. Subsequently, subscriber 150 can initiate a third party call 210 to subscriber 155. Responsive to an off-hook condition, for example where the subscriber 155 either does not have call waiting and subscriber 150 hears a busy signal, or where the subscriber 155 chooses not to answer call waiting requests, the subscriber 150 can request to be included within the existing call 205.

In one aspect of the invention, the subscriber 150 can dial an access number. Once connected through the access number, the subscriber 150 can be prompted to enter the directory number of subscriber 155, and if necessary, to provide a password for verifying that subscriber 150 has authority to intercept or be included within the existing call between subscriber 155 and 160. Upon verifying the identity of the subscriber 150 after the initiated third party call 210, the subscriber 150 can be included within the existing call through connections 215 to subscribers 155 and 160. For example, the service can interact with the three-way calling feature of a telephone switching system to setup a three-way calling bridge.

Notably, if more than two persons are engaged in an existing call, subscriber 150 can be communicatively linked to each existing call participant. It should be appreciated, however, that other embodiments of the present invention are possible. For example, after including subscriber 150 within the existing call, subscriber 150 can be limited to conversing only with subscriber 155, the party to whom subscriber 150 first initiated the call. That is, subscriber 150 can converse with subscriber 155 without other parties involved in the existing call such as subscriber 160 overhearing.

In illustration, the method and apparatus disclosed herein can be used in the case where a parent has registered his or her home directory number for the remote third party calling service. Accordingly, while out at a remote location such as a restaurant or from a wireless telephone, the parent may wish to call home to speak with the parent's child. If the child at home is involved in an existing telephone call and does not respond to call waiting requests, the parent can initiate the remote third party calling service. Specifically, the parent can call an access number, enter the parent's home directory number, and verify his or her identity. The parent then can be included within the existing telephone call between subscriber 155, the child, and subscriber 160, the child's friend. In consequence, the parent can successfully interrupt and join the child's ongoing telephone call without operator assistance.

Similarly, the invention disclosed herein can be used in cases where a third party wishes to join a conference call already in progress. In that case, the directory number used for the conference call, for example a directory number assigned to a conference call or a participant's directory number, can be registered with the remote third party calling service. Accordingly, any callers calling the conference directory number can be included within the existing conference call by dialing an access number, entering the conference call number, and then providing an authorization password to verify that the caller has the authorization to join the existing conference call.

In an alternative embodiment of the present invention, caller ID information from subscriber 150 can be used to verify the caller's identity rather than a password. The caller ID information, for example, can be compared to a list of authorized persons. This embodiment, however, provides less security with regard to enabling unauthorized parties to be included within an existing telephone call, especially in cases where one subscriber borrows another subscriber's telephone or portable telephone.

Figure 3:
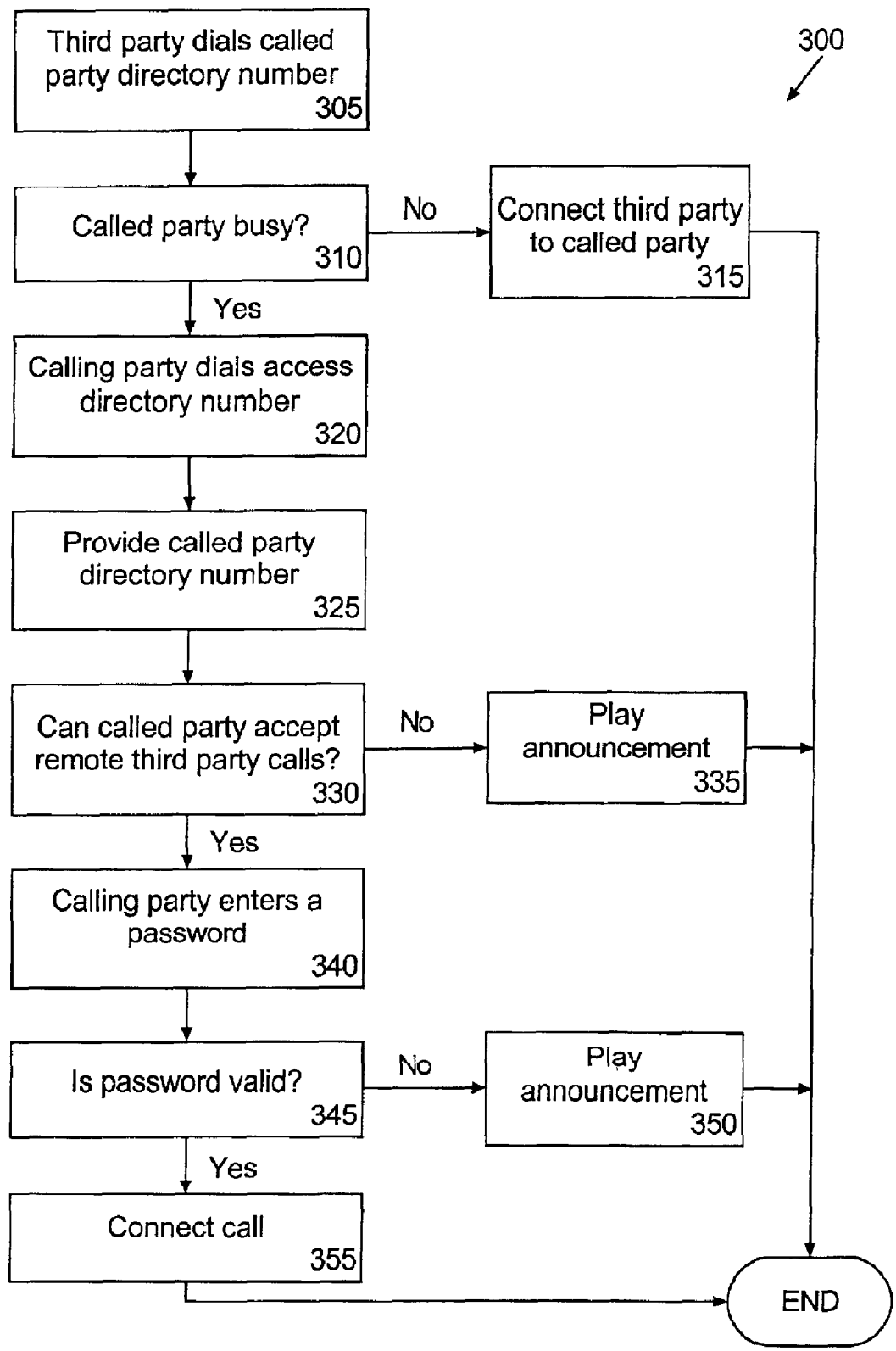
FIG. 3 is a flow chart illustrating a method of setting up remote third party calls.

FIG. 3 is a flow chart illustrating a method 300 of setting up third party calls in accordance with the inventive arrangements disclosed herein. For purposes of illustration, it can be assumed that the called party, if engaged in an existing telephone call, either does not have call waiting or chooses not to respond to call waiting requests. Thus, the method can begin in step 305 where a third party dials the directory number of a called party. In step 310, a determination can be made as to whether the called party is already engaged in an existing telephone call with another party. If not, the method can continue to step 315 where the third party can be connected to the called party. After connecting the third party to the called party, the method can end.

If, however, the called party is engaged in an existing telephone call with another party, for example in the case where a busy indicator is detected, the method can continue to step 320. In step 320, the third party can terminate the initiated call to the called party and dial an access number. The access number can be provided during the unsuccessful attempt to call the called party or at the time of registration or activation of the remote third party calling service. In step 325, the third party can enter the directory number of the called party. After step 325, the method can continue to step 330.

In step 330, a determination can be made as to whether the called party can accept remote third party calls. In particular, a determination can be made as to whether remote setup of third party calls has been activated for the directory number of the called party. If not, the method can continue to step 335 where an announcement can be played to the third party indicating that the directory number of the called party is not registered for the requested service. After step 335, the method can end.

If in step 330, it has been determined that the called party can accept remote third party calls, the method can continue to step 340. In step 340, the third party caller can enter a password. As mentioned, however, the present invention can rely upon other methods for determining whether the third party is an authorized party such as comparing caller ID data to a list of authorized callers. If the password is valid, the method can continue to step 355 where the third party can be connected to the existing call with the called party and any other parties involved in the existing call. If the password is not valid, however, the method can continue to step 350 where an announcement can be played to the third party caller indicating that the entered password was invalid. After playing the announcement in step 350, the method can end.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of establishing a third party call comprising:
   responsive to a telephone call initiated by a third party to a directory number of a called party, first determining that said called party is engaged in an existing telephone call with one or more other parties;
   establishing a telephony connection between the third party and a telephony application via an application directory number that is different from the directory number of the called party;
   receiving the directory number of the called party from the third party;
   processing said telephone call in the telephony application, said telephony application determining whether said third party has authority to join said existing telephone call with said called party; and
   if so, connecting said third party with said existing telephone call.

2. The method of claim 1, wherein said processing step further comprises:
   receiving a password from said third party; and
   determining whether said third party is an authorized party using at least said password.

3. The method of claim 1, wherein said processing step further comprises:
   identifying caller identification information associated with said third party;
   comparing said caller identification information with a list of authorized callers; and
   determining whether said third party is an authorized party.

4. The method of claim 1, wherein said connecting step further comprises:
   connecting said call only if said directory number of said called party has been registered to receive calls initiated from authorized remote third party callers when engaged in an existing telephone call.

5. The method of claim 1, wherein said connecting step comprises:
   establishing a communications link between said third party and said called party exclusive of said other parties involved in said existing telephone call.

6. A method of establishing a third party call comprising:
   receiving a telephone call from said third party to an access directory number;
   receiving a directory number from said third party, wherein said directory number is associated with a called party;
   processing said telephone call in a telephony application, said telephony application determining that said called party is engaged in an existing telephone call with one or more other parties, and determining whether said third party has authority to join said existing telephone call with said called party; and
   if so, connecting said third party with said existing telephone call.

7. The method of claim 6, wherein said processing step further comprises:
   prompting said third party for a password;
   receiving said password from said third party; and
   determining whether said third party is an authorized party using at least said password.

8. The method of claim 6, wherein said processing step further comprises:
   identifying caller identification information associated with said third party;
   comparing said caller identification information with a list of authorized callers; and
   determining whether said third party is an authorized party.

9. The method of claim 6, wherein said connecting step further comprises:
   connecting said call only if said directory number of said called party has been registered to receive calls initiated from authorized remote third party callers when engaged in an existing telephone call.

10. The method of claim 6, wherein said connecting step comprises:
    establishing a communications link between said third party and said called party exclusive of said other parties involved in said existing telephone call.

11. An IP node accessible by a third party via a node directory access number having a telephony application configured to first determine that a called party is engaged in an existing telephone call with one or more other parties responsive to a telephone call initiated by the third party to a directory number of said called party; to process said telephone call in said telephony application, wherein said telephony application determines whether said third party has authority to join said existing telephone call with said called party; and if so, to connect said third party with said existing telephone call.

12. An IP node accessible by a third party via a node directory access number having a telephony application configured to receive a telephone call from the third party to an access directory number; to receive a directory number from said third party, wherein said directory number is associated with a called party; to process said telephone call in said telephony application, wherein said telephony application determines that said called party is engaged in an existing telephone call with one or more other parties and to determine whether said third party has authority to join said existing telephone call with said called party; and if so, to connect said third party with said existing telephone call.

13. A machine-readable storage, having stored thereon a computer program having a plurality of code sections executable by a machine for causing the machine to perform the steps of:
    responsive to a telephone call initiated by a third party to a directory number of a called party, first determining that said called party is engaged in an existing telephone call with one or more other parties;
    establishing a telephony connection between the third party and a telephony application via an application directory number that is different from the directory number of the called party;
    receiving the directory number of the called party from the third party;
    processing said telephone call in the telephony application, said telephony application determining whether said third party has authority to join said existing telephone call with said called party; and
    if so, connecting said third party with said existing telephone call.

14. The machine-readable storage of claim 13, wherein said processing step further comprises:

receiving a password from said third party; and determining whether said third party is an authorized party using at least said password.

15. The machine-readable storage of claim 13, wherein said processing step further comprises:

identifying caller identification information associated with said third party;

comparing said caller identification information with a list of authorized callers; and determining whether said third party is an authorized party.

16. The machine-readable storage of claim 13, wherein said connecting step further comprises:

connecting said call only if said directory number of said called party has been registered to receive calls initiated from authorized remote third party callers when engaged in an existing telephone call.

17. The machine-readable storage of claim 13, wherein said connecting step comprises:

establishing a communications link between said third party and said called party exclusive of said other parties involved in said existing telephone call.

18. A machine-readable storage, having stored thereon a computer program having a plurality of code sections executable by a machine for causing the machine to perform the steps of:

receiving a telephone call from said third party to an access directory number;

receiving a directory number from said third party, wherein said directory number is associated with a called party;

processing said telephone call in a telephony application, said telephony application determining that said called party is engaged in an existing telephone call with one or more other parties, and determining whether said third party has authority to join said existing telephone call with said called party; and if so, connecting said third party with said existing telephone call.

19. The machine-readable storage of claim 18, wherein said processing step further comprises:

prompting said third party for a password;

receiving said password from said third party; and determining whether said third party is an authorized party using at least said password.

20. The machine-readable storage of claim 18, wherein said processing step further comprises:

identifying caller identification information associated with said third party;

comparing said caller identification information with a list of authorized callers; and determining whether said third party is an authorized party.

21. The machine-readable storage of claim 18, wherein said connecting step further comprises:

connecting said call only if said directory number of said called party has been registered to receive calls initiated from authorized remote third party callers when engaged in an existing telephone call.

22. The machine-readable storage of claim 18, wherein said connecting step comprises:

establishing a communications link between said third party and said called party exclusive of said other parties involved in said existing telephone call.

* * * * *